United States Patent
Kurakake et al.

(10) Patent No.: US 7,346,651 B2
(45) Date of Patent: Mar. 18, 2008

(54) METHOD OF SEARCHING INFORMATION SITE BY ITEM KEYWORD AND ACTION KEYWORD

(75) Inventors: Yasushi Kurakake, Hamamatsu (JP); Mitsuo Hori, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 962 days.

(21) Appl. No.: 10/022,992

(22) Filed: Dec. 17, 2001

(65) Prior Publication Data

US 2002/0091683 A1 Jul. 11, 2002

(30) Foreign Application Priority Data

Dec. 18, 2000 (JP) .............................. 2000-383853

(51) Int. Cl.
*G06F 15/16* (2006.01)
(52) U.S. Cl. .............................. 709/203; 707/6; 707/3; 707/4
(58) Field of Classification Search ................ 709/203, 709/225, 226, 227, 246, 200, 201, 224, 206; 707/2–5, 10, 200, 104; 717/103; 382/305; 704/9

See application file for complete search history.

(56) References Cited

U.S. PATENT DOCUMENTS

| | | | | |
|---|---|---|---|---|
| 5,673,428 A | * | 9/1997 | Hirakawa | 707/5 |
| 5,704,060 A | * | 12/1997 | Del Monte | 707/104.1 |
| 5,757,983 A | * | 5/1998 | Kawaguchi et al. | 382/305 |
| 5,819,261 A | * | 10/1998 | Takahashi et al. | 707/3 |
| 5,850,518 A | * | 12/1998 | Northrup | 709/203 |
| 5,893,091 A | * | 4/1999 | Hunt et al. | 707/3 |
| 5,913,215 A | * | 6/1999 | Rubinstein et al. | 707/3 |

(Continued)

FOREIGN PATENT DOCUMENTS

WO WO 00/57293 9/2000

OTHER PUBLICATIONS

A Classification Scheme for Software Artifacts (Position Paper)—Girardi, Ibrahim (Correct) 'search a file for a string' consists of the verb 'search'in the infinitive form, followed by the noun cui.unige.ch/VISUAL_PROG/articles/ASIS94.ps.gz.*

(Continued)

*Primary Examiner*—Thong Vu
(74) *Attorney, Agent, or Firm*—Morrison & Foerster LLP

(57) ABSTRACT

A method is designed for searching contents information presented by a plurality of information sites over a network based on a query sent from a client terminal to a searching server through the network. The method is carried out by the computer-implemented steps of registering information sites which present contents information involving various items and actions related to each other, initiating the client terminal to transmit a query to the searching server through the network, the query containing an item keyword indicating an item as a target of searching and an action keyword indicating an action to be made on the item, operating the searching server according to the query to search for one or more of the registered information sites having contents information matching the query, and to send back directory information indicative of locations of the searched information sites to the client terminal, and operating the client terminal according to the directory information for accessing the searched information sites, thereby enabling a user to make the action on the item.

18 Claims, 5 Drawing Sheets

U.S. PATENT DOCUMENTS

| | | | | |
|---|---|---|---|---|
| 5,963,941 | A * | 10/1999 | Hirakawa | 707/5 |
| 5,974,413 | A * | 10/1999 | Beauregard et al. | 707/6 |
| 6,233,547 | B1 * | 5/2001 | Denber | 704/9 |
| 6,247,010 | B1 * | 6/2001 | Doi et al. | 707/3 |
| 6,272,493 | B1 * | 8/2001 | Pasquali | 707/10 |
| 6,314,418 | B1 * | 11/2001 | Namba | 707/2 |
| 6,334,126 | B1 * | 12/2001 | Nagatomo et al. | 707/4 |
| 6,418,452 | B1 * | 7/2002 | Kraft et al. | 707/200 |
| 6,424,980 | B1 * | 7/2002 | Iizuka et al. | 707/4 |
| 6,523,065 | B1 * | 2/2003 | Combs et al. | 709/226 |
| 6,546,413 | B1 * | 4/2003 | Northrup | 709/200 |
| 6,606,657 | B1 * | 8/2003 | Zilberstein et al. | 709/224 |
| 6,643,641 | B1 * | 11/2003 | Snyder | 707/4 |
| 6,658,409 | B1 * | 12/2003 | Nomura et al. | 707/4 |
| 6,721,804 | B1 * | 4/2004 | Rubin et al. | 709/246 |
| 6,760,746 | B1 * | 7/2004 | Schneider | 709/203 |
| 6,850,934 | B2 * | 2/2005 | Bates et al. | 707/5 |
| 6,915,507 | B1 * | 7/2005 | Kaler et al. | 717/103 |
| 6,928,479 | B1 * | 8/2005 | Meyer et al. | 709/227 |
| 6,961,712 | B1 * | 11/2005 | Perkowski | 705/27 |
| 7,020,679 | B2 * | 3/2006 | Tian | 709/201 |
| 2001/0037241 | A1 * | 11/2001 | Puri | 705/14 |
| 2001/0056418 | A1 * | 12/2001 | Youn | 707/3 |
| 2002/0035643 | A1 * | 3/2002 | Morita | 709/245 |
| 2002/0046074 | A1 * | 4/2002 | Barton | 705/8 |
| 2002/0178225 | A1 * | 11/2002 | Madenberg et al. | 709/206 |
| 2003/0009518 | A1 * | 1/2003 | Harrow et al. | 709/203 |
| 2003/0088562 | A1 * | 5/2003 | Dillon et al. | 707/5 |
| 2004/0225645 | A1 * | 11/2004 | Rowney et al. | 707/3 |
| 2005/0055337 | A1 * | 3/2005 | Bebo et al. | 707/3 |
| 2005/0256866 | A1 * | 11/2005 | Lu et al. | 707/5 |
| 2006/0026013 | A1 * | 2/2006 | Kraft | 705/1 |

OTHER PUBLICATIONS

IMPACT: The Interactive Maryland Platform for..—Arisha, Kraus.. (1998) (Correct) (6 citations) by itself can constitute a service, e.g. the verb search may be a service name. Similarly, www.cs.umd. edu/~vs/agent/papers/impact.ps.gz.*

DL and IR: IR models and methods,metadata and evaluation—University Of Dortmund (Correct) remove inflection/derivation ending proximity search noun phrase components within certain distance/www.iei.pi.cnr.it/DELOS/delos2/SummerSchool/hand-outs1/issdl.*

Yahoo: Profile of a Web Database, Dan Lester, Albertsons Library, Boise State University, Dec. 1995.

The anatomy of a large-scale hypertextual Web search engine, Sergey Brin, Lawrence Page, Computer Science Department, Stanford University, Stanford, CA, USA, 1998.

* cited by examiner

METHOD OF SEARCHING INFORMATION SITE BY ITEM KEYWORD AND ACTION KEYWORD

BACKGROUND OF THE INVENTION

The present invention relates to a method of using a network and retrieving content information of an information site (server) via a search site (server) by means of a terminal device connected to the network, and concerns an information storage medium used for the information search method.

In recent years, there has been an increased use of networks such as the Internet owing to various terminals such as personal computers and portable telephones. A user of these terminals can obtain various types of information by searching information sites. For example, the user connects a personal computer (client) to a search site (server) and sends a keyword corresponding to desired information. The search site can search an information site (server) containing information corresponding to the keyword, and can provide the client user with the site information such as an URL. Generally, a keyword used for this search is a noun, allowing an AND operation by combining a plurality of keywords.

Users may search information for various purposes. A conventional method uses just a combination of noun keywords, and often retrieves information, which does not match the user's purpose. Accordingly, the user needs to select intended information from the retrieved information, causing unsatisfactory usability.

SUMMARY OF THE INVENTION

It is therefore an object of the present invention to allow search of information matching the client user's purpose as much as possible, and to provide a user-friendly information search method.

The inventive method is designed for searching contents information presented by a plurality of information sites over a network based on a query sent from a client terminal to a searching server through the network. The method comprises the computer-implemented steps of registering information sites which present contents information involving various items and actions related to each other, initiating the client terminal to transmit a query to the searching server through the network, the query containing an item keyword indicating an item as a target of searching and an action keyword indicating an action to be made on the item, operating the searching server according to the query to search for one or more of the registered information sites having contents information matching the query, and to send back directory information indicative of locations of the searched information sites to the client terminal, and operating the client terminal according to the directory information for accessing the searched information sites, thereby enabling a user to make the action on the item.

The information search method according to the invention as configured above uses an item keyword and an action keyword. For example, the item keyword such as "commodity A" indicates the relevant commodity. The action keyword such as "purchase" corresponds to an action to purchase commodity A. These keywords are sent to a search site. The search site searches an information site having content information matching the item keyword "commodity A" and the action keyword "purchase". For example, the content information mentions that a certain client sells commodity A. The search site sends a piece of or pieces of site information indicating information site(s) to the client. Based on this site information, the client can retrieve the content information from the corresponding information site. This method can retrieve information matching the client user's purpose as much as possible, thereby improving usability.

An inventive searching server apparatus is used in a system of searching for contents information presented by a plurality of information sites over a network based on queries sent from client terminals through the network. The searching server apparatus comprises a prompting section that operates when a client terminal accesses the searching server for prompting the client terminal to input a query, a receiving section that receives the inputted query from the client terminal through the network, the inputted query containing an item keyword indicating an item as a target of searching and an action keyword indicating an action to be made on the item, an operating section that operates according to the received query to search for one or more information sites having contents information matching the received query, and a transmitting section that sends back directory information indicative of locations of the searched information sites to the client terminal, thereby enabling the client terminal to access the searched information sites according to the directory information, whereby a user of the client terminal can make the action on the item.

Preferably, the prompting section provides a list of various item keywords and action keywords with the client terminal such that the user can select a set of an item keyword and an action keyword from the list to formulate the query.

Preferably, the searching server apparatus further comprises a database that stores the directory information of the information sites spread over the network together with the item keywords and the action keywords matching the contents information presented by the respective information sites. In such a case, the operating section can search for one or more information sites with reference to the database according to the query.

Preferably, the searching server apparatus further comprises a registering section that responds to a request for registration of a new information site from a client terminal, for registering directory information of the new information site together with an item keyword and an action keyword matching the contents information presented by the new information site. The registering section responds to the request for registration of the new information site from the client terminal, for providing a list of various item keywords and action keywords with the client terminal such that the user can select a set of an item keyword and an action keyword from the list in matching with the contents information presented by the new information site.

An inventive client terminal apparatus is involved in a system of searching for contents information presented by a plurality of information sites over a network based on a query sent to a searching server through the network. The client terminal apparatus comprises an accessing section that accesses the searching server for establishing communication with the searching server through the network, an input section that transmits the query to the searching server through the network, the query containing an item keyword indicating an item as a target of searching and an action keyword indicating an action to be made on the item, thereby enabling the searching server to search for one or more information sites having contents information matching the query, an output section that receives directory information indicative of locations of the searched information sites from the searching server through the network, and an operating section that operates according to the directory information for accessing the searched information sites, thereby enabling a user to make the action on the item.

Preferably, the input section is provided with a list of various item keywords and action keywords from the searching server such that the user can select a set of an item keyword and an action keyword from the list to formulate the query.

Preferably, the input section can send a request for registration of a new information site to the searching server, such that the searching server registers directory information of the new information site together with an item keyword and an action keyword matching the contents information presented by the new information site. In such a case, the input section is provided with a list of various item keywords and action keywords from the searching server, such that the user can select a set of an item keyword and an action keyword from the list in matching with the contents information presented by the new information site.

An inventive storage medium is provided for storing an index table used by a searching server for searching contents information presented by a plurality of information sites over a network based on a query sent from a client terminal through the network, the query containing an item keyword indicating an item as a target of searching and an action keyword indicating an action to be made on the item. The index table memorizes a correspondence between information sites spread over the network and subject items involved in the contents information of the information sites and related actions mentioned in the contents information, such that the searching server can search for one or more information sites based on the query with reference to the index table.

A server program is executable by a searching server for searching contents information presented by a plurality of information sites over a network based on a query sent from a client terminal through the network. The server program comprises the steps of prompting the client terminal to input a query when the client terminal accesses the searching server, receiving the inputted query from the client terminal through the network, the inputted query containing an item keyword indicating an item as a target of searching and an action keyword indicating an action to be made on the item, searching for one or more information sites having contents information matching the received query, and sending back directory information indicative of locations of the searched information sites to the client terminal, thereby enabling the client terminal to access the searched information sites according to the directory information, whereby a user of the client terminal can make the action on the item.

A client program is executable by a client terminal for enabling a searching server to search contents information presented by a plurality of information sites over a network based on a query sent to the searching server through the network. The client program comprises the steps of accessing the searching server for establishing communication with the searching server through the network, transmitting the query to the searching server through the network, the query containing an item keyword indicating an item as a target of searching and an action keyword indicating an action to be made on the item, thereby enabling the searching server to search for one or more information sites having contents information matching the query, receiving directory information indicative of locations of the searched information sites from the searching server through the network, and accessing the searched information sites according to the directory information, thereby enabling a user to make the action on the item.

DETAILED DESCRIPTION OF THE INVENTION

Figure 3:
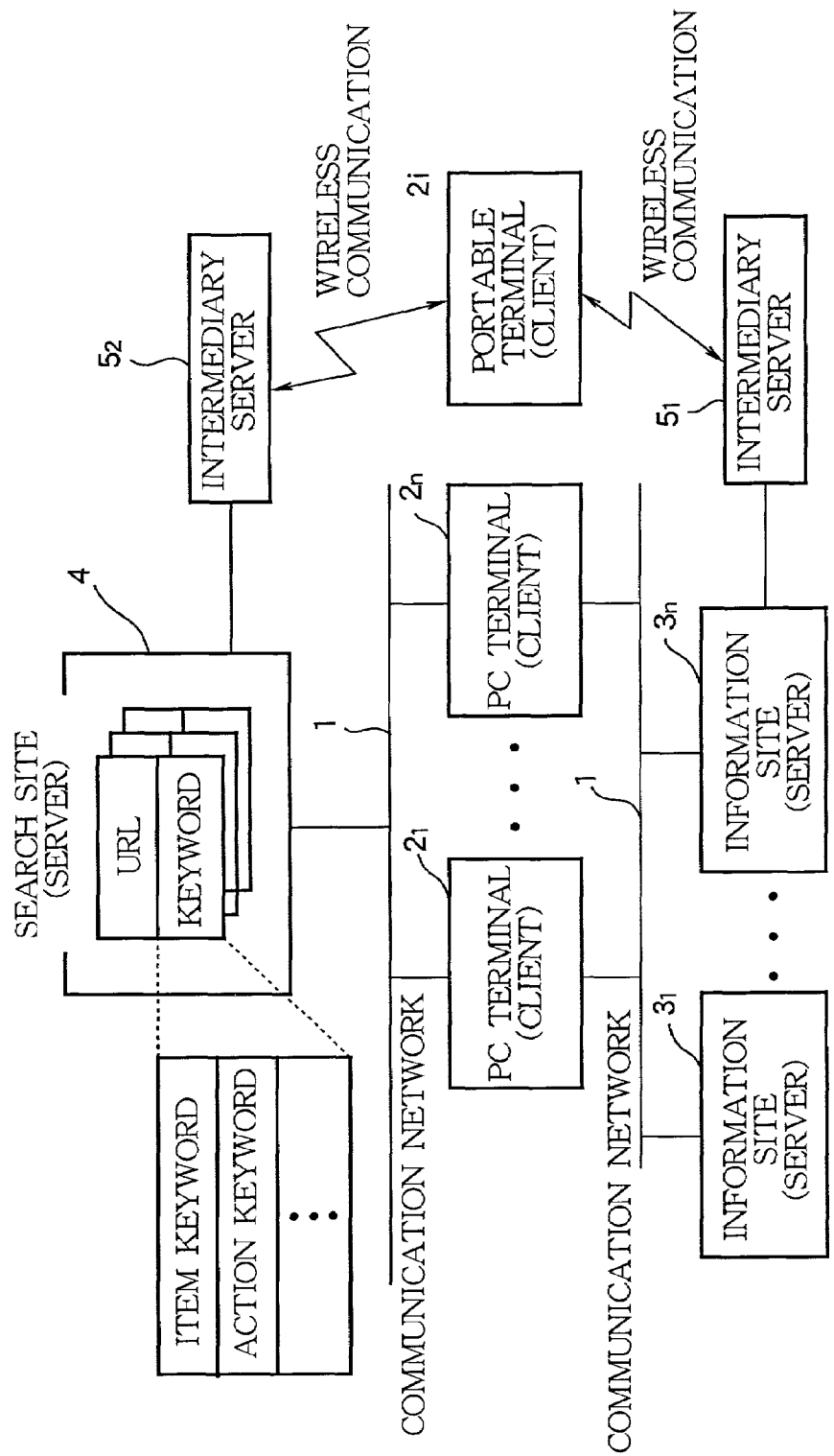
FIG. 3 shows a configuration example of a network system to which the information search method is applied according to the embodiment of the present invention.

An embodiment of the present invention will be described with reference to the accompanying drawings. FIG. 3 shows a configuration example of the network system to which an information search method is applied as an embodiment of the present invention. A communication network 1 connects with personal computers $2_1$, to $2_n$, as clients, a plurality of information sites $3_1$, to $3_n$, as servers for the clients, and a search site 4. The information site $3_n$ and the search site 4 connect with intermediary servers $5_1$ and $5_2$, respectively. A portable terminal $2_i$ such as a portable telephone functions as a client and is connected to the information sites $3_1$ to $3_n$, and the search site 4 by means of the wireless communication.

The communication network 1 includes intermediary servers $5_1$ and $5_2$, etc. Based on Internet protocols such as WWW (HTTP), for example, many providers form a network comprising many servers such as information sites $3_1$, to $3_n$, the search site 4, and many clients such as personal computer terminals $2_1$ to $2_n$, the portable terminal $2_i$, etc.

It may be preferable to connect a plurality of search sites 4. In this case, each search site can be considered to be equivalent to each other. The embodiment describes one search site 4. While the figure shows a plurality of clients including personal computer terminals $2_1$ to $2_n$ and the portable terminal $2_i$, these clients independently perform similar processing for the information sites $3_1$ to $3_n$, and the search site 4. The following description represents these clients typically as one client 2. A suffix to the reference numeral is used for distinguishing the same types of components from each other. The suffix is omitted when any representative component is indicated without distinction.

The search site 4 stores a plurality of pieces of "site information" to be retrieved. In this embodiment, the site information is an URL (uniform resource locator) indicative of any one of a plurality of information sites $3_1$, to $3_n$ existing on the network. The URL is associated with a keyword appropriate for the contents of the information site 3 indicated by each URL. There is a plurality of associated keywords which include an "item keyword" and an "action keyword". The keyword is any one of predefined words. The following embodiment also expresses the item keyword as a "genre keyword" and the action keyword as an "objective keyword".

Namely, an information storage medium such as a database in the search site 4 stores URLs indicating a plurality of information sites $3_1$ to $3_n$ on the network. Each URL is associated with a genre keyword indicating content information of each of information sites $3_1$ to $3_n$ and an objective keyword corresponding to an action for the content information of the information site.

The genre keyword is a noun expressing information content provided by the information site 3, such as types of commodities including services, etc. For example, genre keywords include an acoustic musical instrument, electronic musical instrument, DTM, concert, artist, musical score, CD, net distribution, MIDI, call signal with melodies, karaoke, etc. The "DTM" indicates desktop music software. The "artist" denotes music software, concerts, etc. of the artist. The "net distribution" or "MIDI" provides various types of distributed information such as performance data, karaoke software, and programs. These types of commodities include services, etc.

The objective keyword is a verb expressing information equivalent to a specific action provided by the information site 3 or action (processing) available in the information site 3. This keyword specifies action to be taken by a user of the client terminal 2 (hereafter just referred to as a user) in relation to the content information. Specifically, objective keywords include "inquire", "buy", "sell", "teach", "learn", "borrow", "sing", "listen", etc.

In the above example, the objective keyword "purchase" corresponds to user action to purchase an item. The objective keyword "sell" corresponds to user action to sell an item. The objective keyword "teach" corresponds to action to teach a subject. The objective keyword "learn" corresponds to action to learn a subject. Namely, in this embodiment, the action keyword is referred to as the objective keyword because the action keyword directly corresponds to an objective (action) of the client 2 aiming at acquiring information.

Here, it is assumed that a first user has an objective of "purchasing commodity A". From the information site, this user finally needs to acquire information about a second user(s) having an objective of "selling commodity A". In order to deal with this case, the embodiment allows the search site 4 to store an objective keyword as well as a URL and a genre keyword. The objective keyword is specified as the first user's objective keyword "purchase" so that it corresponds to the second user's objective keyword "sell".

Accordingly, in this embodiment, when the second user registers information about "selling commodity A" to a specific information site, the search site 4 uses a database to store an index table containing the URL of the specific information site, the genre keyword "commodity A", and the objective keyword "purchase" corresponding to each other. The similar correspondence is maintained for other actions and objective keywords.

This is just one predetermined correspondence based on search conditions. It may be preferable to use an action keyword corresponding to action of a user (client) who needs to acquire information and another action keyword corresponding to action of another user who wishes to provide information associated with each other. In consideration of correspondence during search in the search site, any correspondence (i.e., way of determining an action keyword) is acceptable if it is possible to search an information site having content information matching with the item keyword and associated action corresponding to the action keyword.

In the above example, the database in the search site 4 may store the URL of the specific information site, "commodity A", and "sell" associated with each other. It may be preferable to search for information by detecting a keyword "sell" corresponding to an objective keyword "purchase".

The client 2 may be available in any form if it can acquire information from the information site 3. The client 2 uses a conventionally known Internet browser to handle information in the search site 4 and the information site 3. The client 2 accesses the search site 4 to search and acquire the URL of the information site 3, which provides user-requested information. The client 2 then uses the acquired directory information (URL) to access the information site and acquire the target information. The information site 3 stores various types of contents information (sources in the form of a plurality of HTML-created WWW pages) to be provided to the client 2. The information site 3 then returns the source corresponding to the request (access) from the client 2 to the client terminal.

Figure 7:
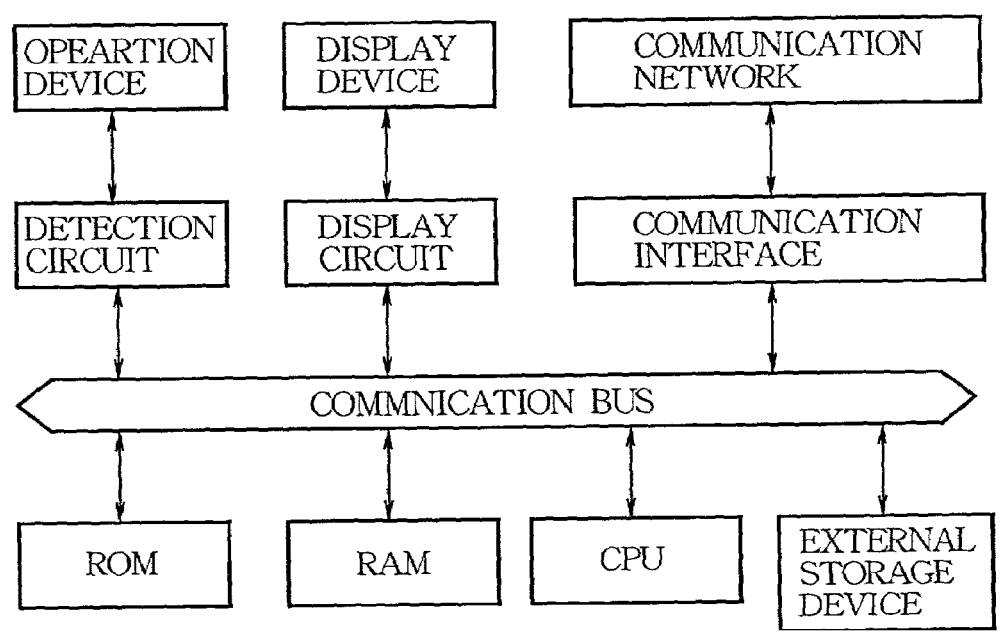
FIG. 7 shows a hardware configuration of a computer for the client terminal or searching server according to the embodiment of the present invention.

FIG. 7 shows a hardware configuration of a personal computer terminal in the client 2. An operation device is a mouse or a keyboard connected to the personal computer. Any operation device is available such as a special switch or an electronic musical instrument capable of input music performance. The hardware configuration in the search site 4 and the information site 3 or the hardware configuration of a portable terminal as the client 2 is basically the same as that shown in FIG. 7. The search site 4 uses RAM, ROM, external storage, etc. to store a plurality of pieces of information (URLs and keywords) for specifying an information site 3 and a program for searching according to the invention. The site information database includes already stored information and information added (registered) from the client 2. The information site 3 uses RAM, ROM, external storage, etc. to store various types of information provided to the client 2. These types of information include a plurality of HTML-created WWW page sources (page display information) etc. transmitted by HTTP. A wireless communication device is used for a communication interface of the portable terminal. The operation devices are various switches mounted on the portable terminal.

The following describes search and registration processes in the embodiment. The search process uses a search screen. The registration process uses a registration screen. For example, the search screen comprises a search page (Web page) created by an HTML file and contains search screen information. The registration screen comprises a registration page (Web page) created by an HTML file and contains registration screen information. The search site 4 distributes these screens to the client 2. For example, the screens are displayed on a personal computer's monitor (display device) in the client 2. A mouse is used for input operations on these screens. Once a mouse pointer (cursor) is placed on the screen, a mouse button can be pressed and released without moving the mouse. This operation is called "mouse-clicking" or simply "clicking".

Figure 4:
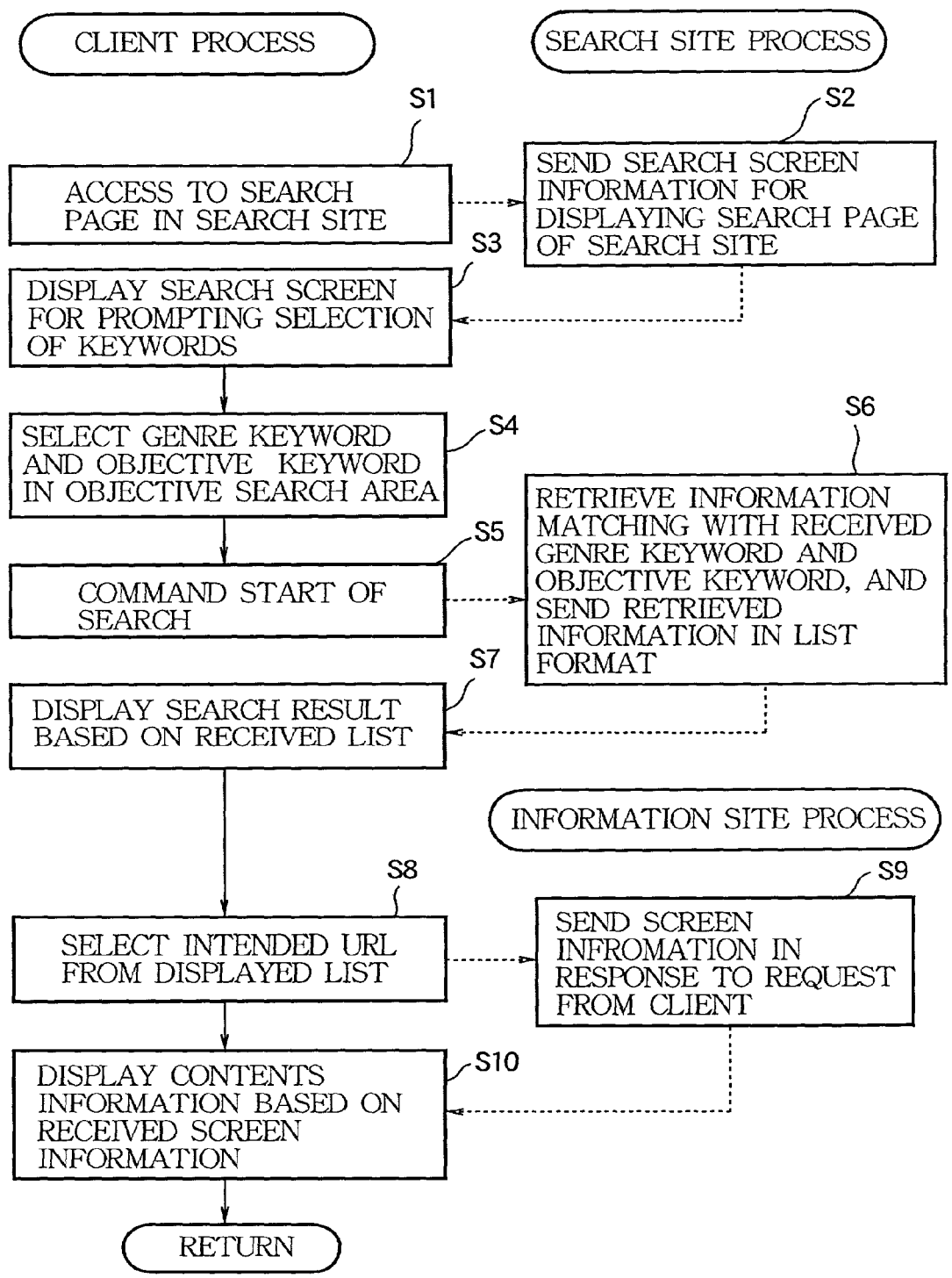
FIG. 4 shows processes in a client terminal, a search site, and an information site during search according to the embodiment of the present invention.

FIG. 4 shows processes in the client 2, the search site 4, and the information site 3. First, the client 2 accesses a search page in the search site 4 (step S1). In response to this operation, the search site 4 sends search screen information to the client 2 for displaying the search page (step S2). The client 2 displays the search screen based on the received search screen information (step S3). For example, the search screen prompts a user of the client 2 to select a keyword.

Then, the user selects a genre keyword and an objective keyword from an objective search area (described later) in the search screen (step S4) and initiates the search (step S5). The genre keyword and the objective keyword are sent to the search site 4.

The search site 4 searches for directory information (information site URLs) containing the received genre keyword and objective keyword from the database. The search site 4 lists the searched information to create list information and sends it to the client 2 (step S6). The client 2 displays the search result (list) based on the received list information (step S7). The client 2 selects an intended URL from the displayed list, and accesses content information of the information site corresponding to the URL (step S8). By doing this operation, the client 2 can connect to the information site 3 having the intended information. The information site 3 sends screen information in response to a request from the client 2 (step S9). The client 2 displays the contents information based on the received screen information (step S10).

Figure 2:
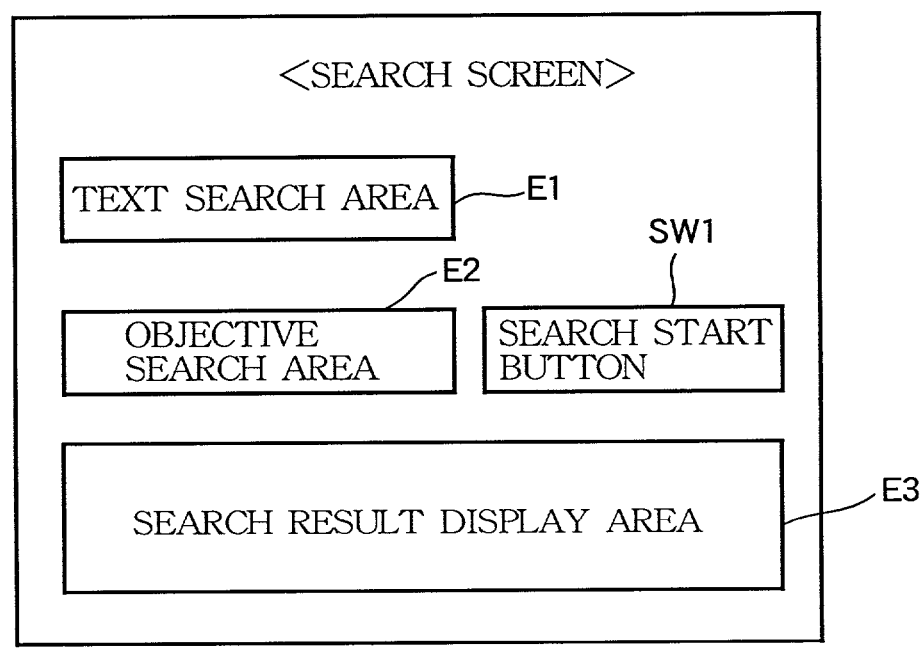
FIG. 2 shows a display example of a search screen according to the embodiment of the present invention.

FIG. 2 shows a display example of the search screen. The search screen contains a text search area E1, an objective search area E2, a search result display area E3, and a search start button SW1. The objective search area E2 is provided in accordance with the embodiment of the present invention. The search result display area E3 displays information about a search result. The search start button SW1 is used for commanding initiation of the search. This is a mouse-clickable on-screen switch. The text search area E1 is used for entering any character string for search using an input character string in the same manner as the prior art. Search operations using this input character string are the same as those for the prior art and description is omitted here.

Figure 1:
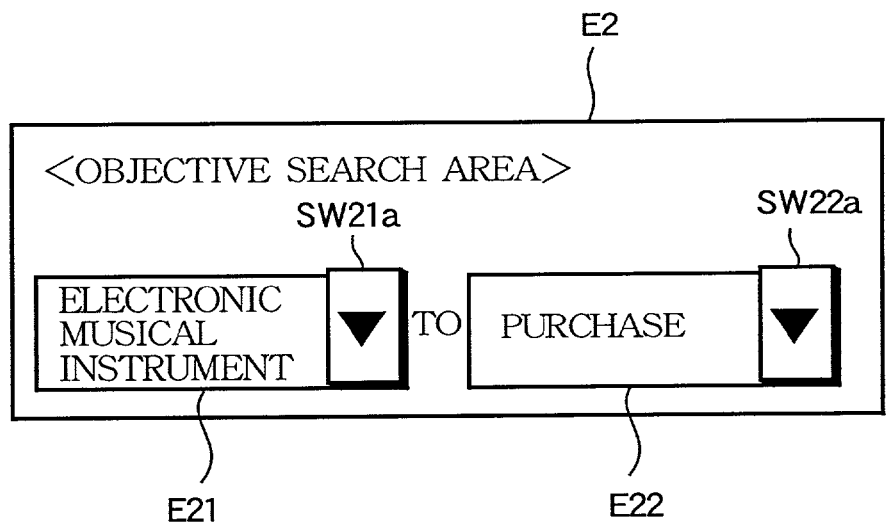
FIG. 1 shows a display example of an objective search area in a search screen according to an embodiment of the present invention.

FIG. 1 shows a display example of the objective search area E2. The objective search area E2 contains a genre selection area E21 and an objective selection area E22. Beside these areas, drop-down switches SW21a and SW22a (on-screen switches) are displayed. Clicking the drop-down switch SW21a displays a list box containing a plurality of predefined genre keywords below the genre selection area E21. When a genre keyword is selected (clicked) from the list box, the selected genre keyword is displayed in the genre selection area E21. In the example, the genre keyword "electronic musical instrument" is selected. Likewise, clicking the drop-down switch SW22a displays a list box containing a plurality of predefined objective keywords below the objective selection area E22. When an objective keyword is selected (clicked) from the list box, the selected objective keyword is displayed in the objective selection area E22. In the example, the objective keyword "purchase" is selected. These operations correspond to steps S3 and S4 in FIG. 4.

A word "to" is displayed between the drop-down switch SW21a and the objective selection area E22. when selecting the genre keyword and the objective keyword as mentioned above, the user can enter a phrase comprising the display content in the genre selection area E21 and the display content in the objective selection area E22 in the form of "something to do". In the example of the figure, the phrase means "electronic musical instrument to purchase". Accordingly, the user can easily express his or her objective during the input operation with highly improved usability.

When the genre keyword and the objective keyword are selected as mentioned above, clicking the search start button SW1 in FIG. 2 transmits the selected genre keyword and objective keyword to the search site 4. This operation corresponds to step S5 in FIG. 4. As mentioned above, the search site 4 retrieves a URL of the information site based on the genre keyword and the objective keyword, and transmits a search result (list). This operation corresponds to step S6 in FIG. 4. The search result is displayed in the search result display area E3. This operation corresponds to step S7 in FIG. 4.

Figure 6:
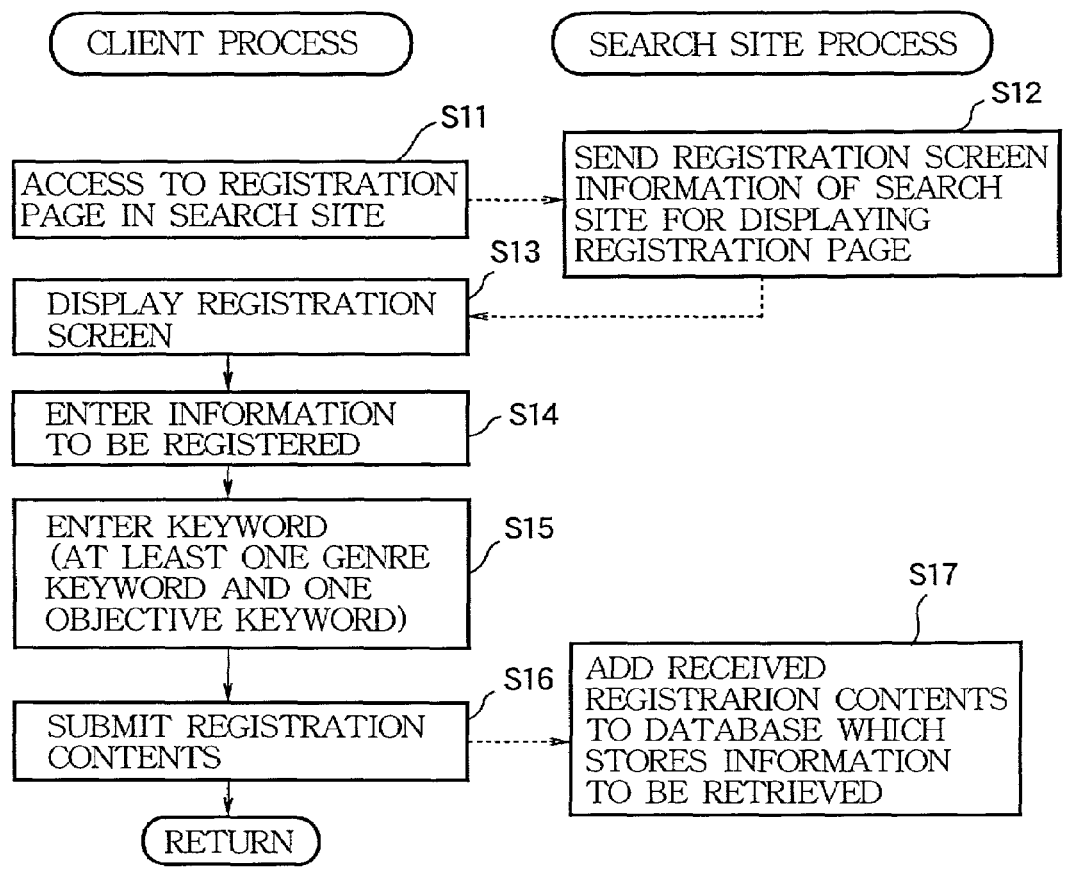
FIG. 6 shows processes in the client terminal and search site during the registration according to the embodiment of the present invention.

FIG. 6 shows processes in the client 2 and the search site 4 when the user registers new site information to the search site. First, the client 2 accesses a registration page in the search site 4 (step S11). In response to this operation, the search site 4 sends registration screen information to the client 2 for displaying the registration page (step S12). The client 2 displays the registration page (described later) based on the received registration screen information (step S13). The client 2 then enters directory information (a URL) in the registration screen (step S14). The client 2 further enters at least one of the genre keyword and the objective keyword to be attached to this information or URL (step S15), and then submits the registration contents (step S16). This operation sends the registration contents to the search site 4. The search site 4 adds the received registration contents to the database which stores existing site information to be retrieved (step S17). This accumulates the registered information to the database to be subsequently retrieved in the search site.

Figure 5:
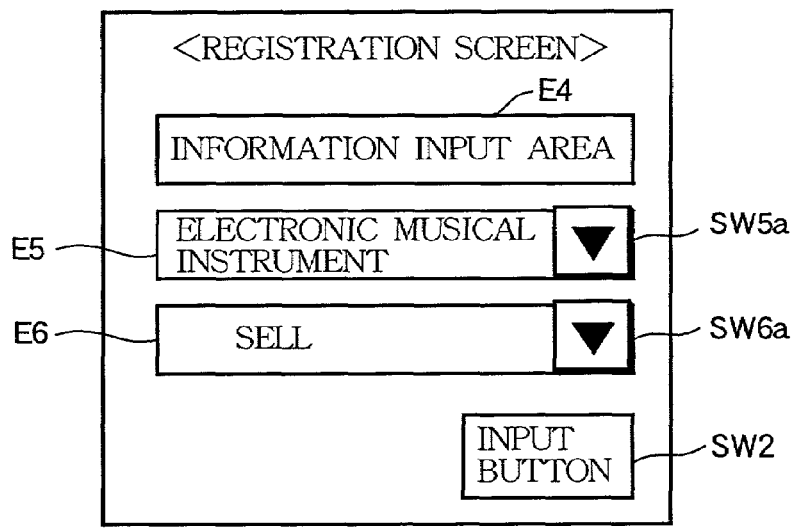
FIG. 5 shows a display example of a registration screen according to the embodiment of the present invention.

FIG. 5 shows a display example of the registration screen. The registration screen contains an information input area E4, a genre keyword selection area E5, an objective keyword selection area E6, and an input button (on-screen switch) SW2 for submitting input information. The information input area E4 is used for entering information to be registered. This information can be an information site URL registered for the use of user's objectives such as selling and purchasing.

Drop-down switches (on-screen switches) SW5a and SW6a are displayed besides the genre keyword selection area E5 and the objective keyword selection area E6. Clicking the drop-down switch SW5a displays a list box containing a plurality of predefined genre keywords below the genre keyword selection area E5. An intended genre keyword can be selected from the list box. The example in the figure shows that the genre keyword "electronic musical instrument" is selected. Likewise, clicking the drop-down switch SW6a displays a list box containing a plurality of predefined objective keywords below the objective keyword selection area E6. An intended objective keyword can be selected from the list box. The example in the figures shows that the objective keyword "sell" is selected.

Clicking the input button SW2 settles the URL entered in the information input area E4, the genre keyword entered in the genre keyword selection area E5, and the objective keyword entered in the objective keyword selection area E6 to be registration information (site information to be newly added). This information is sent to the search site 4.

The above description assumes a personal computer using a mouse for processing various operations such as display, search, registration, etc. A portable terminal such as a portable telephone is also available for these processes according to specific operations.

In the search site 4, the database stores an index table containing the item keyword (genre keyword) and the action keyword (objective keyword) corresponding to the URL. It may be preferable to store the item keyword and the action keyword as part of the URL or part of a URL path name.

It may be preferable to allow a plurality of item keywords and action keywords to correspond to one URL.

Instead of words, it may be preferable to provide (display) a picture or an icon equivalent to the item keyword and the action keyword.

The embodiment allows keywords to be selected from the list boxes for the genre selection area E21, the objective selection area E22, the genre keyword selection area E5, and the objective keyword selection area E6. It may be preferable to let a user enter an intended keyword by means of a word-processing function.

The inventive information search method provides an item keyword indicating contents information and an action keyword corresponding to an action for the contents information. These keywords are used for searching an information site having the content information indicated by the item keyword and matching the action keyword. Therefore, it is possible to retrieve information matching client user's objectives as much as possible, thereby improving usability. In addition, the inventive method enables the item keyword and the action keyword to be entered as a sentence, and permits the client or user to easily express his or her objectives, thereby further improving usability.

What is claimed is:

1. A method of searching for contents information presented by a plurality of information sites over a network based on a query sent from a client terminal to a searching server through the network, the method comprising the computer-implemented steps of:

prompting the client terminal to input a query; enabling the client terminal to transmit the query to the searching server through the network, the query containing an item keyword indicating an item as a target of searching and an action keyword indicating an action to be made on the item;

operating the searching server according to the query to search for one or more of the information sites having contents information matching the query, and to send back directory information indicative of locations of the searched information sites to the client terminal;

operating the client terminal according to the directory information for accessing the searched information sites; and registering directory information of a new information Site in the searching server together with an item keyword and an action keyword matching contents information presented by the new information site in response to a request for registration of the new information site from a client terminal and in response to a user of the client terminal inputting the director',/ information, the item keyword and the action keyword; and registering information indicating another action corresponding to the action indicated by the registered action keyword.

2. The method according to claim 1, further comprising the computer-implemented step of registering information indicating another action corresponding to the action indicated by the registered action keyword.

3. A searching server apparatus used in a system of searching for contents information presented by a plurality of information sites over a network based on queries sent from client terminals through the network, the searching server apparatus comprising:

a prompting section that operates when a client terminal accesses the searching server for prompting the client terminal to input a query;

a receiving section that receives the inputted query from the client terminal through the network, the inputted query containing an item keyword indicating an item as a target of searching and an action keyword indicating an action to be made on the item;

an operating section that operates according to the received query to search for one or more information sites having contents information matching the received query;

a transmitting section that sends back directory information indicative of locations of the searched information sites to the client terminal; and a registering section, that responds to a request for registration of a new information site from a client terminal and that responds to directory information of the new information site, an item keyword and an action keyword inputted by a user in the client terminal, for registering the directory information of the new information site together with an the item keyword and an the action keyword matching the contents information presented by the new information site; and wherein the registering section registers information indicating another action corresponding to the action indicated by the registered action keyword.

4. The searching server apparatus according to claim 3, wherein the prompting section provides a list of various item keywords and action keywords with the client terminal such that the user can select a set of an item keyword and an action keyword from the list to formulate the query.

5. The searching server apparatus according to claim 3, further comprising a database that stores the directory information of the information sites spread over the network together with the item keywords and the action keywords matching the contents information presented by the respective information sites.

6. The searching server apparatus according to claim 5, wherein the operating section can search for one or more information sites with reference to the database according to the query.

7. The searching server apparatus according to claim 3, wherein the registering section responds to the request for registration of the new information site from the client terminal, for providing a list of various item keywords and action keywords with the client terminal such that the user can select a set of an item keyword and an action keyword from the list in matching with the contents information presented by the new information site.

8. The searching server apparatus according to claim 3, wherein the registering section registers information indicating another action corresponding to the action indicated by the registered action keyword.

9. A client terminal apparatus in a system of searching for contents information presented by a plurality of information sites over a network based on a query sent to a searching server through the network, the client terminal apparatus comprising:

an accessing section that accesses the searching server for establishing communication with the searching server through the network;

an input section that transmits the query to the searching server through the network, the query containing an item keyword indicating an item as a target of searching and an action keyword indicating an action to be made on the item;

an output section that receives directory information indicative of locations of the searched information sites from the searching server through the network; and an operating section that operates according to the directory information for accessing the searched information sites;

wherein the input section can send a request for registration of a new information site to the searching server and can send directory information of the new information site, an item keyword and an action keyword to the searching server, such that the searching server registers the directory information of the new information site together with the item keyword and the action keyword matching the contents information presented by the new information site; and wherein the searching server registers information indicating another action corresponding to the action indicated by the registered action keyword.

10. The client terminal apparatus according to claim 9, wherein the input section is provided with a list of various item keywords and action keywords from the searching server such that the user can select a set of an item keyword and an action keyword from the list to formulate the query.

11. The client terminal apparatus according to claim 9, wherein the input section is provided with a list of various item keywords and action keywords from the searching server, such that the user can select a set of an item keyword and an action keyword from the list in matching with the contents information presented by the new information site.

12. The client terminal apparatus according to claim 9, wherein the searching server registers information indicating another action corresponding to the action indicated by the registered action keyword.

13. A storage medium for storing an index table used by a searching server for searching contents information presented by a plurality of information sites over a network based on a query sent from a client terminal through the network, the query containing an item keyword indicating an item as a target of searching and an action keyword indicating an action to be made on the item, wherein the index table memorizes a correspondence between information sites spread over the network and subject items involved in the contents information of the information sites and related actions mentioned in the contents information, such that the searching server can search for one or more information sites based on the query with reference to the index table; and wherein the index table memorizes a correspondence between a registered directory information of a new information site and an item keyword and an action keyword matching contents information presented by the new information site in response to a request for registration of the new information Site from a client terminal to the searching server and in response to a user of the client terminal inputting the directory information, the item keyword and the action keyword; and wherein the index table memorizes a correspondence between information indicating another action and the action indicated by the registered action keyword.

14. The storage medium of claim 13 wherein the index table memorizes a correspondence between information indicating another action and the action indicated by the registered action keyword.

15. A computer program embedded in a computer readable medium and executable by a searching server for searching contents information presented by a plurality of information sites over a network based on a query sent from a client terminal through the network, the computer program comprising the steps of:

prompting the client terminal to input a query when the client terminal accesses the searching server;

receiving the inputted query from the client terminal through the network, the inputted query containing an item keyword indicating an item as a target of searching and an action keyword indicating an action to be made on the item;

searching for one or more information sites having contents information matching the received query;

sending back directory information indicative of locations of the searched information sites to the client terminal; and registering directory information of a new information site together with an item keyword and an action keyword matching the contents information presented by the new information site in response to a request for registration of the new information site from a client terminal and in response to a user of the client terminal inputting the directory information, the item keyword and the action keyword.

16. The computer program of claim 15 further comprising the step of registering information indicating another action corresponding to the action indicated by the registered action keyword.

17. A computer program embedded in a computer readable medium and executable by a client terminal for enabling a searching server to search contents information presented by a plurality of information sites over a network based on a query sent to the searching server through the network, the computer program comprising the steps of:

accessing the searching server for establishing communication with the searching server through the network;

transmitting the query to the searching server through the network, the query containing an item keyword indicating an item as a target of searching and an action keyword indicating an action to be made on the item;

receiving directory information indicative of locations of the searched information sites from the searching server through the network;

accessing the searched information sites according to the directory information; and sending a request for registration of a new information site to the searching server and a directory information of the new information site, an item keyword and an action keyword to the searching server, such that the searching server registers the directory information of the new information site together with an the item keyword and the action keyword matching the contents information presented by the new information site.

18. The computer program of claim 17 wherein the searching server registers information indicating another action corresponding to the action indicated by the registered action keyword.

* * * * *